Patented Jan. 14, 1941

2,228,332

UNITED STATES PATENT OFFICE 2,228,332

COATING OBJECTS WITH ARTIFICIAL MATERIALS

Georg Wick and Arnd Iloff, Bitterfeld, Germany, assignors to I. G. Farbenindustrie Aktiengesellschaft, Frankfort-on-the-Main, Germany No Drawing. Application March 22, 1938, Serial No. 197,336. In Germany March 25, 1937

3 Claims. (Cl. 154—2)

This invention relates to a process for coating objects of metal, wood, cement, concrete and other porous non-heat conducting building materials with polymerisates of vinyl chloride, which is particularly useful for coating metal objects carried out in the manner described hereafter.

It has been proposed to use polymerisates of the vinyl series for covering objects of various kinds. The proposals have comprised the application of the polymerisation product, insofar as it is soluble in an organic solvent, in lacquer form to the object to be covered or should the polymerisate be in the form of a fine powder or a sheet this form is applied to the object and an adherent coating obtained by heating the whole to the softening point under pressure, which is maintained until the object has again become cold. The coatings obtained in this way do not fulfill the highest requirements since they easily crack or flake off; polyvinyl chloride is especially useless for this mode of application; although it yields films of satisfactory strength in relation to mechanical strains it has only a very low adhesive quality.

A metal object to be coated is first roughened superficially by means of a sand blast, an etching liquor or some other means, and there is then applied a lacquer containing a polymerisate of the vinyl series. After the lacquer has become fully dry in the air it is heated to the temperature at which it flows, whereby the solvent is completely removed. On to the still plasting coating of lacquer is now pressed the sheet of polyvinyl chloride which is to constitute the desired coating. After cooling this coating is found to be firmly bound to the metal surface.

This process of coating is of especial value when sheets of polyvinyl chloride are used which, as stated above, have otherwise an especially poor tendency to adhere. The following example illustrates the application of the invention to the coating of a vessel with a sheet of polyvinyl chloride.

Example 1.—The surface of the metal vessel which is to be coated is treated with a sand blast and then there are applied three coatings of a solution of 10 per cent. strength of after-chlorinated polyvinyl chloride in methylene chloride, each layer being dried in air before the next is applied. By heating the vessel externally the residual solvent in the coating is expelled. The heating may be performed by applying a burner flame to the wall of the vessel or by radiant heat or by convection heating. During this heating small bubbles formed by the vapor of the solvent render the coating turbid and only when no turbidity remains is the drying complete. A burning of the layer of lacquer, recognizable by a browning of the layer, must, of course, be avoided.

On this coating of lacquer which is made plastic by the heat there is pressed a sheet of polyvinyl chloride which has preferably been previously painted with a solution of 20 per cent. strength of after-chlorinated polyvinyl chloride in acetone and has been freed from residual solvent, left after drying, by being laid upon a hot plate. The sheet is applied with its lacquered surface against the lacquered wall of the vessel and firmly pressed thereagainst, any bubbles of air still present being carefully removed by means of a rubber roller or the like. The coating has a surprising adhesion to the metal surface.

In a similar manner other objects consisting of, for instance, wood, cement or concrete, may be coated with polymerisates of vinyl chloride. This method is illustrated by the following example:

Example 2.—On the surface of the wooden object which is to be coated, there are applied three coatings of a solution of 10 percent. strength of after-chlorinated polyvinyl chloride in methylene chloride, each layer being dried in air before the next is applied. Then shortly before application of the polyvinyl sheet a fourth coating of the sticking solution mentioned above, is applied and allowed to dry for 10 minutes. Then a sheet consisting of pure polyvinyl chloride is coated twice with a solution of 20 per cent. strength of after-chlorinated polyvinyl chloride in acetone, in this case, likewise, each layer being dried in air before the next is applied. The sheet then is slightly pressed with its lacquered surface against the lacquered wall of the wooden object and heated to about 100° C., so that it becomes plastic. By slightly rubbing any bubbles of air still present, are carefully removed. The residues of solvent still remained in the sticking layer, vaporise during this heat treatment and escape through the pores of the wood, whereby a solid union of the polyvinyl chloride sheet with the lacquer is obtained.

What we claim is:

1. The process for coating objects with polyvinyl chloride which comprises applying a layer of after-chlorinated polyvinyl chloride to the object, applying a layer of after-chlorinated polyvinyl chloride to a polyvinyl chloride sheet, covering the lacquered surface of the object with the lacquered polyvinyl chloride sheet with application of heat up to about 100° C. while slightly pressing the sheet against the surface of the object.

2. The process for coating metal objects with polyvinyl chloride which comprises applying a layer of after-chlorinated polyvinyl chloride to the object, applying a layer of after-chlorinated polyvinyl chloride to a polyvinyl chloride sheet, heating the lacquer on the object to the temperature at which the lacquer flows and slightly pressing on the still plastic layer of lacquer the covering sheet of polyvinyl chloride with its lacquered side.

3. The process for coating porous objects with polyvinyl chloride which comprises applying a layer of after-chlorinated polyvinyl chloride to the object, applying a layer of after-chlorinated polyvinyl chloride to a polyvinyl chloride sheet, covering the lacquered surface of the object with the lacquered polyvinyl chloride sheet, and heating the latter to about 100° C. until it becomes plastic while slightly pressing it against the surface of the object, thus completely removing the residual solvent.

GEORG WICK.
ARND ILOFF.